(12) United States Patent
Hu et al.

(10) Patent No.: US 8,242,408 B2
(45) Date of Patent: Aug. 14, 2012

(54) MASKING DEVICE FOR LASER MACHINING SYSTEM AND METHOD

(75) Inventors: Zhaoli Hu, Dunlap, IL (US); Marion Billingsley Grant, Princeville, IL (US)

(73) Assignee: Caterpillar Inc., Peoria, IL (US)

( * ) Notice: Subject to any disclaimer, the term of this patent is extended or adjusted under 35 U.S.C. 154(b) by 1006 days.

(21) Appl. No.: 12/222,680

(22) Filed: Aug. 14, 2008

(65) Prior Publication Data

US 2009/0045180 A1 Feb. 19, 2009

Related U.S. Application Data

(60) Provisional application No. 60/935,480, filed on Aug. 15, 2007.

(51) Int. Cl.
*B23K 26/18* (2006.01)
*B23K 26/38* (2006.01)

(52) U.S. Cl. .................................................. 219/121.71

(58) Field of Classification Search ............ 219/121.61, 219/121.67–121.72
See application file for complete search history.

(56) References Cited

U.S. PATENT DOCUMENTS

| | | | | |
|---|---|---|---|---|
| 3,612,814 A | * | 10/1971 | Houldcroft | 219/121.67 |
| 3,981,230 A | * | 9/1976 | Lee | 493/196 |
| 4,436,979 A | | 3/1984 | Nilsen | 219/121.63 |
| 4,857,696 A | * | 8/1989 | Taeusch et al. | 219/121.7 |
| 5,222,617 A | * | 6/1993 | Gregory et al. | 219/121.71 |
| 5,345,057 A | | 9/1994 | Muller | |
| 5,886,320 A | | 3/1999 | Gallo et al. | |
| 5,994,667 A | | 11/1999 | Merdan et al. | |
| 6,070,813 A | * | 6/2000 | Durheim | 239/533.2 |
| 6,139,303 A | | 10/2000 | Reed et al. | |
| 6,303,901 B1 | * | 10/2001 | Perry et al. | 219/121.71 |
| 6,355,907 B1 | | 3/2002 | Kuehnle et al. | |
| 6,365,871 B1 | | 4/2002 | Knowles et al. | |
| 6,407,362 B1 | | 6/2002 | Schmid et al. | |
| 6,495,796 B2 | | 12/2002 | Fukaya et al. | |
| 6,586,705 B1 | | 7/2003 | Schell | |
| 7,026,571 B2 | * | 4/2006 | Larsen | 219/121.69 |
| 7,301,121 B2 | | 11/2007 | Callies et al. | |
| 2006/0086700 A1 | | 4/2006 | Callies et al. | |
| 2007/0175872 A1 | | 8/2007 | Rhoades et al. | |

FOREIGN PATENT DOCUMENTS

| | | |
|---|---|---|
| DE | 19908630 | 8/2000 |
| EP | 0750964 | 1/1997 |
| EP | 1661658 A1 * | 5/2006 |
| EP | 1661658 | 11/2008 |
| EP | 1669157 | 11/2008 |
| JP | 56160893 A * | 12/1981 |
| JP | 58 218387 | 12/1983 |
| JP | 63194887 A * | 8/1988 |

\* cited by examiner

*Primary Examiner* — Samuel M Heinrich

(74) *Attorney, Agent, or Firm* — Finnegan, Henderson, Farabow, Garrett & Dunner LLP

(57) ABSTRACT

A laser machining system for machining a workpiece is disclosed. The workpiece may have a primary surface and a secondary surface. The system may have a laser emitter configured to emit a laser beam. The system may also have a masking device having an absorbing portion formed from corundum. The absorbing portion may have a surface portion shaped to approximately correspond to a contour of an inner side of the primary surface of the workpiece.

20 Claims, 3 Drawing Sheets though the gap of the '813 patent around the backing material of the '813 patent. Similarly, laser beams can leak around cylindrically shaped glass fibers. Leaked laser beams can impinge on untargeted surfaces, causing undesired heating and machining of these untargeted surfaces.

MASKING DEVICE FOR LASER MACHINING SYSTEM AND METHOD

CROSS-REFERENCE TO RELATED APPLICATION

This application claims the benefit of U.S. Provisional Patent Application Ser. No. 60/935,480, filed Aug. 15, 2007, entitled "Laser Machining Masking Device and Method," which is hereby incorporated by reference in its entirety.

TECHNICAL FIELD

The present disclosure is directed to a masking device and, more particularly, to a masking device for a laser machining system and method.

BACKGROUND

Industrial lasers are used for a variety of machining operations. One such operation includes using a laser to create holes completely or partially through a workpiece. In the case of a workpiece in the form of a thin-walled shell, it is often desirable to use a laser to form a hole extending through a wall of the workpiece. Due to the geometry of some workpieces, a situation may arise wherein, after the desired hole is formed in a first surface of a workpiece, the laser beam used to drill the hole impinges on a second surface of the workpiece. As shown in FIG. 1, for example, a laser beam 2 is used to form a hole in a first surface 4 of a workpiece 6. After laser beam 2 penetrates first surface 4, laser beam 2 impinges on a second surface 8. Impinging on second surface 8 in this manner can undesirably affect second surface 8. Specifically, second surface 8 can be unintentionally and undesirably machined or heat treated. For example, a laser beam being used to drill orifices in a fuel injector nozzle can impinge on and undesirably affect interior surfaces of the fuel injector nozzle.

One way to prevent a laser beam from impinging on a surface of a workpiece is to block the laser beam with a mask. An example of this strategy is described in U.S. Pat. No. 6,070,813 (the '813 patent) issued to Durheim on Jun. 6, 2000. The '813 patent describes interposing a backing material between a first interior surface and a second untargeted interior surface to prevent a laser beam from passing through the first interior surface and impinging on the second untargeted interior surface. The backing material is a block of one of the following groups of materials: tungsten, tungsten carbide, ceramic, or other high temperature material. These materials have the ability to absorb a large amount of laser energy without disintegrating. The backing material is separated from the first interior surface by an air gap, which allows the laser beam to diverge, thereby reducing the power density of the beam that strikes the backing material. In addition, the gap allows convective air currents to cool the backing material. The backing material is replaced if formation of a passageway in the first interior surface damages the backing material such that it is unable to block the laser beam and protect the second untargeted interior surface.

Other types of prior art masks have a cylindrical shape and are made from glass fibers that scatter and absorb energy of laser beams. The glass fibers are typically cylindrical with substantially flat ends.

Although the backing material of the '813 patent and other types of prior art masks may initially protect untargeted interior surfaces from laser beams used to create holes, they may fail during long and/or repetitive machining operations. Specifically, bonds between molecules and/or atoms of the materials used in the block of the '813 patent and/or in other prior art masks (glass) are unable to withstand long and/or repetitive machining operations. Additionally, laser beams can leak The present disclosure is directed to overcoming one or more of the problems set forth above and/or other problems in the art.

SUMMARY

In one aspect, the present disclosure is related to a method of making a masking device for protecting a secondary surface of a workpiece from energy of a laser beam used to machine a primary surface of the workpiece. The method may include selecting a material, the material including at least one of corundum, cubic zirconia, spinel, diamond, or alumina ceramic. The method may also include shaping a piece of the selected material such that a surface portion of the piece approximately corresponds to a contour of an inner side of the primary surface of the workpiece.

In another aspect, the present disclosure is related to a method of laser machining a primary surface of a workpiece. The workpiece may also include a secondary surface. The method may include providing a masking device including a tip formed from a material, the material including at least one of corundum, cubic zirconia, spinel, diamond, or alumina ceramic. The method may also include positioning the masking device such that a surface portion of the tip of the masking device is adjacent to an inner side of the primary surface of the workpiece. Additionally, the method may include contacting the primary surface of the workpiece with a laser beam to machine a hole through the primary surface. The method may also include protecting the secondary surface from energy of the laser beam by absorbing at least part of the energy of the laser beam with the tip of the masking device.

In yet another aspect, the present disclosure is related to a laser machining system for machining a workpiece. The workpiece may include a primary surface and a secondary surface. The system may include a laser emitter configured to emit a laser beam. The system may also include a masking device including an absorbing portion formed from corundum. The absorbing portion may include a surface portion shaped to approximately correspond to a contour of an inner side of the primary surface of the workpiece.

DETAILED DESCRIPTION

Figure 1:
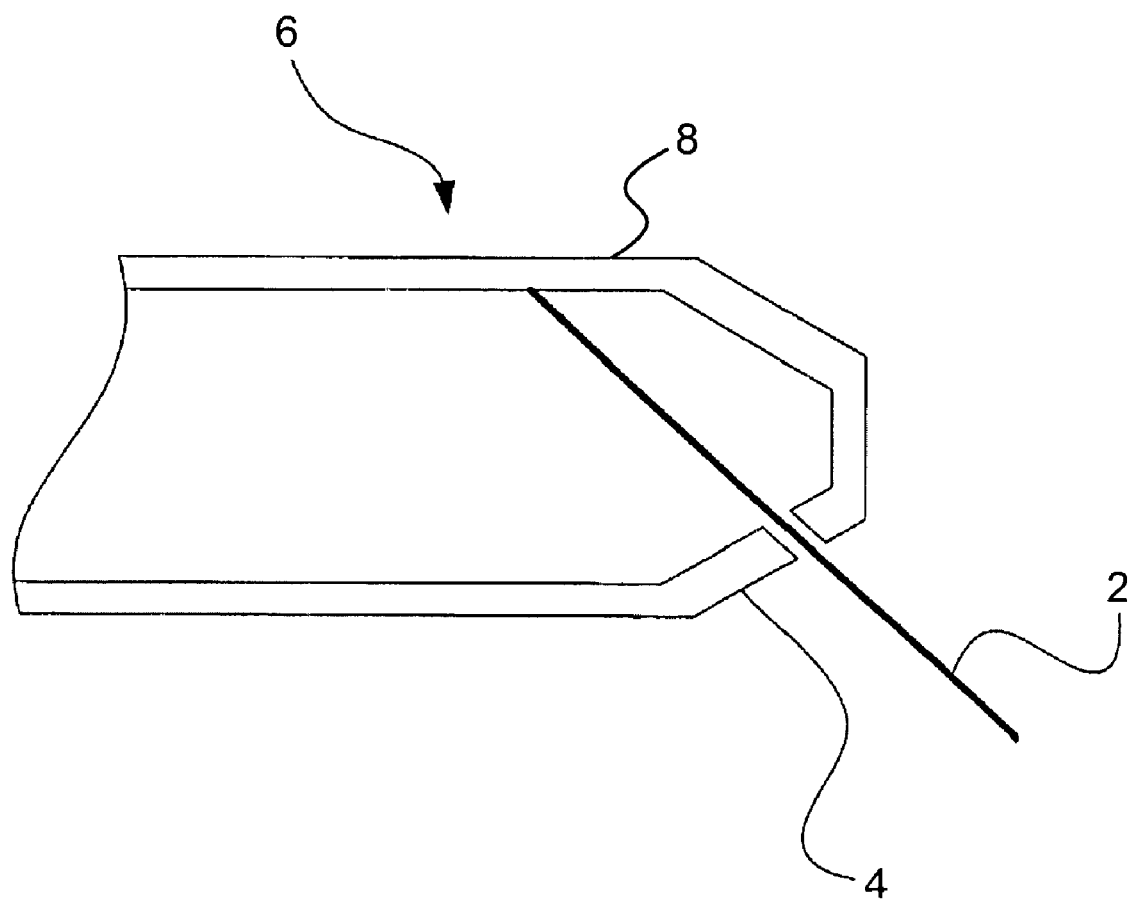
FIG. 1 is an illustration of a laser beam penetrating a first surface of a workpiece and impinging on a second surface of the workpiece.
Figure 2:
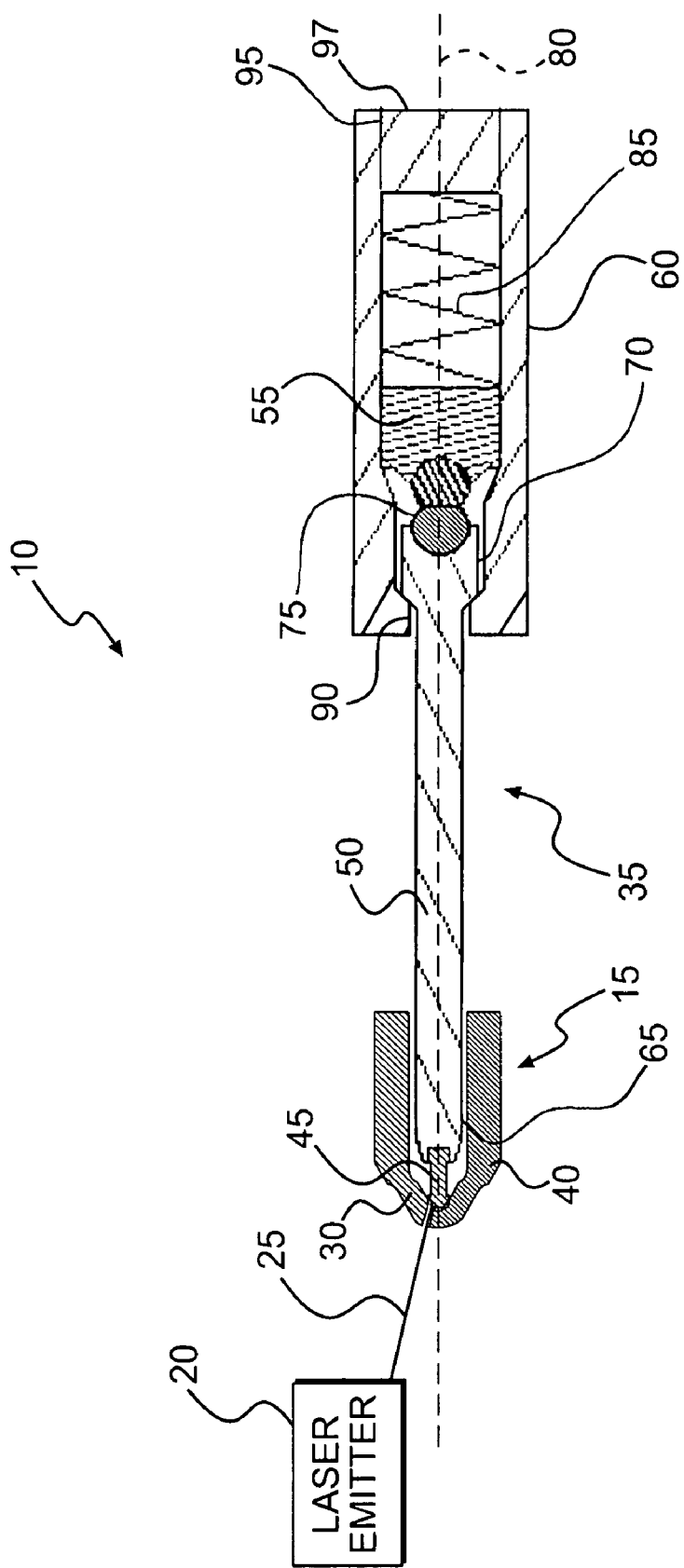
FIG. 2 is an illustration of an exemplary disclosed laser machining system having a masking device.

FIG. 2 illustrates an exemplary laser machining system 10 for machining a workpiece 15. Specifically, machining system 10 may include a laser emitter 20 for machining workpiece 15. Laser emitter 20 may include, for example, a superpulse laser, a femto second laser, or another laser operable to machine workpiece 15. In particular, laser emitter 20 may emit energy in the form of a laser beam 25, which may contact and machine workpiece 15. It is contemplated that laser beam 25 may contact and machine a hole through a primary surface 30 of workpiece 15. After machining the hole, laser beam 25 may penetrate primary surface 30. For this reason, machining system 10 may also include a masking device 35 for protecting a secondary surface 40 of workpiece 15 from energy of laser beam 25. Additionally, machining system 10 may include a jig (not shown), which may hold workpiece 15 and masking device 35, positioning masking device 35 relative to workpiece 15.

Masking device 35 may include an absorbing portion in the form of a tip 45, which may at least partially absorb the energy of laser beam 25, thereby masking or protecting secondary surface 40 of workpiece 15. Some of the absorbed energy, which may be in the form of thermal energy, may be conducted away from tip 45 by a rod 50, which may hold tip 45. For example, tip 45 may be connected to rod 50 via a mechanical press fit. In some embodiments, masking device 35 may also include a plunger 55 situated within a housing 60. Together, plunger 55 and housing 60 may, in conjunction with the jig, position rod 50 and tip 45 relative to workpiece 15, as described in more detail below.

Tip 45 may be formed from a material capable of absorbing energy of laser beam 25 during machining of workpiece 15. For example, the material may include at least one of corundum, cubic zirconia, spinel, diamond, or alumina ceramic. In some embodiments, the material may have a multi-crystalline structure, which may scatter laser beam 25 within tip 45. This may prevent laser beam 25 from exiting tip 45 and impinging on secondary surface 40 in beam form. Tip 45 may also be shaped via machining to prevent laser beam 25 from leaking around tip 45 and impinging on secondary surface 40. This shaping may vary according to workpiece 15, and will be discussed in further detail below. Additionally, tip 45 may be shaped to prevent or reduce focusing of laser beam 25 within the interior of tip 45, preventing or reducing concentration of energy from laser beam 25 within the interior of tip 45, and extending the useful life of tip 45. For example, tip 45 may be aspherically shaped where laser beam 25 may impinge on tip 45.

As previously discussed, energy absorbed by tip 45 may be conducted away from tip 45 by rod 50. Therefore, rod 50 may be formed from a metal having a high thermal conductivity, such as, for example, copper or aluminum. This high thermal conductivity may allow rod 50 to quickly transfer energy in the form of thermal energy away from tip 45, preventing accumulation of energy from laser beam 25 within tip 45, and extending the useful life of tip 45. As illustrated in FIG. 2, rod 50 may have a first rod end 65, which may be configured to hold tip 45. Rod 50 may also have a second rod end 70, which may have a spherical impression for connecting rod 50 to plunger 55 via a connector 75.

Connector 75 may have two spherical ends. One spherical end may be sized to fit into the spherical impression of second rod end 70, while the other spherical end may be sized to fit into a spherical impression of plunger 55. These spherical ends of connector 75 may allow rod 50 and tip 45 to rotate and pivot relative to plunger 55 and housing 60. Connector 75 may also allow plunger 55 to laterally position rod 50 and tip 45 relative to housing 60 (i.e., move rod 50 and tip 45 along an axis 80 of rod 50). This lateral positioning may be in response to a force provided by a biasing device. For example, the lateral positioning may be in response to compression and/or expansion of a spring 85, which may be connected to plunger 55 and situated within housing 60. Specifically, spring 85 may compress against or expand from an end of housing 60 when rod 50 and tip 45 are positioned relative to workpiece 15, causing spring 85 to push plunger 55 and laterally position rod 50 and tip 45. It should be noted, however, that second rod end 70 may be situated within housing 60 to limit movement of rod 50 and tip 45. Specifically, second rod end 70 may be situated within housing 60, between a first opening 90 and a second opening 95 of housing 60. First opening 90 may be smaller than second rod end 70, preventing advancement of second rod end 70 beyond first opening 90. And, second opening 95 may be sealed by a cap 97, which may prevent advancement of second rod end 70 beyond second opening 95. Cap 97 may also be the end from which spring 85 may expand and against which spring 85 may compress.

Masking device 35 may be assembled by first inserting rod 50 into housing 60 through second opening 95 until first opening 90 holds rod 50 (i.e., prevents further advancement of rod 50). It should be noted, however, that first rod end 65 may pass through first opening 90, exposing first rod end 65, before first opening 90 holds second rod end 70. Connector 75, plunger 55, and spring 85 may then be inserted into housing 60 through second opening 95. Next, cap 97 may be removably secured to second opening 95 via, for example, threads or another type of fastener known in the art.

Figure 3:
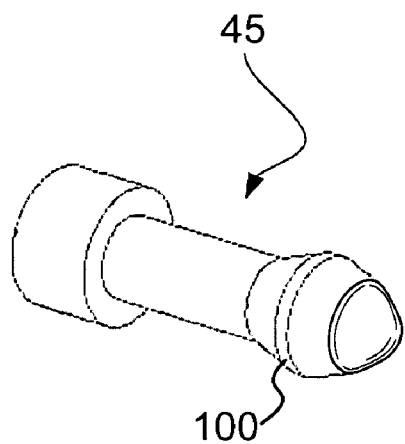
FIG. 3 is an illustration of a tip for use with the masking device of FIG. 2.
Figure 4:
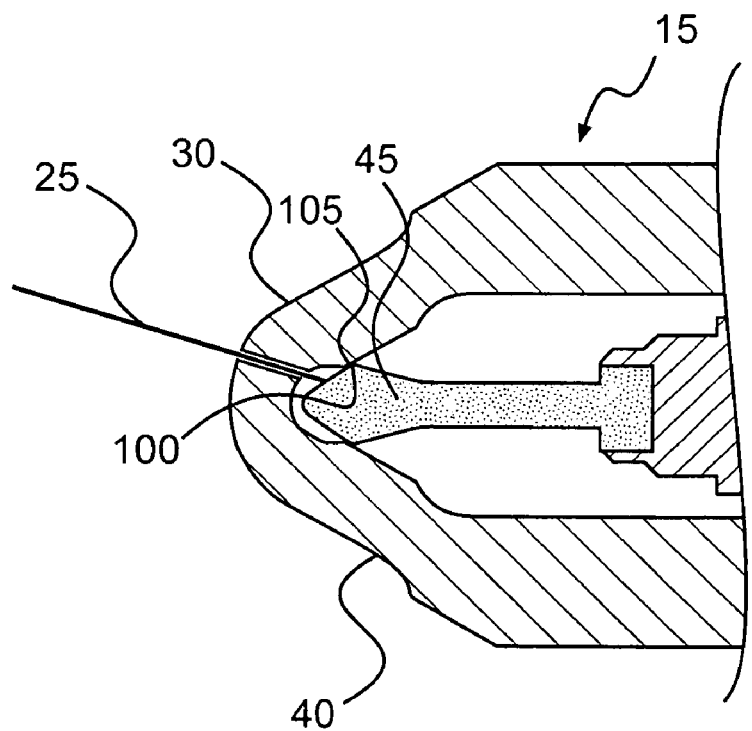
FIG. 4 is an illustration of the tip of FIG. 3 positioned to absorb at least part of the energy of a laser beam penetrating a primary surface of a workpiece.

As previously discussed, plunger 55 and housing 60 may, in conjunction with the jig, position rod 50 and tip 45 relative to workpiece 15. This positioning may vary according to the shape of tip 45 and the form of workpiece 15. For example, as illustrated in FIGS. 3 and 4, tip 45 may be shaped to protect secondary surface 40. Secondary surface 40 may be in the form of a needle seat of a fuel injector. Specifically, a maximum diameter surface portion 100 of tip 45 may be shaped such that it approximately corresponds to a contour of an inner side 105 of primary surface 30 of workpiece 15. Although FIGS. 3 and 4 illustrate surface portion 100 as being circularly shaped, it should be understood that FIGS. 3 and 4 are exemplary only. Surface portion 100 may be otherwise shaped so long as it approximately corresponds to the contour of inner side 105. The shaping of tip 45 may prevent laser beam 25 from leaking around tip 45 and impinging on secondary surface 40 once tip 45 is positioned by moving housing 60 relative to workpiece 15. In particular, housing 60 and/or workpiece 15 may be moved such that tip 45 is inserted into workpiece 15 until surface portion 100 of tip 45 is adjacent to inner side 105. In particular, the movement may compress spring 85, causing spring 85 to push plunger 55 and laterally position rod 50 and tip 45 against inner side 105. The movement may also cause rod 50 and tip 45 to rotate relative to plunger 55 such that tip 45 and rod 50 are aligned coaxially with workpiece 15.

INDUSTRIAL APPLICABILITY

The disclosed laser machining system may be applicable to laser machining operations wherein a laser beam can undesirably impinge on a surface of a workpiece. In particular, the disclosed masking device may protect the surface of the workpiece during long and/or repetitive machining operations. A laser machining method employing the masking device will now be described with reference to FIGS. 2-4.

The method may include selecting a material for use in forming tip 45. As previously discussed, the material may include at least one of corundum, cubic zirconia, spinel, diamond, or alumina ceramic. The selection may be based on the wavelength of laser beam 25. For example, ruby (a type of corundum) may be selected when the wavelength of laser beam 25 is between approximately 490 nanometers and approximately 570 nanometers (i.e., when laser beam 25 is green). As another example, blue sapphire (another type of corundum) may be selected when the wavelength of laser beam 25 is between approximately 800 nanometers and approximately 2500 nanometers (i.e., when laser beam 25 is near infrared). As yet another example, another type of corundum such as, for example, padparadscha, yellow sapphire, green sapphire, or another color of sapphire may be selected. By selecting the material based on the wavelength of the laser beam, an ability of tip 45 to absorb energy from laser beam 25 may be enhanced.

Additionally, the method may include shaping the selected material to form tip 45. Specifically, a piece of the selected material may be shaped such that tip 45 includes surface portion 100 of tip 45, which approximately corresponds to the contour of inner side 105. The piece of the selected material may also be aspherically shaped where laser beam 25 may impinge on it, preventing or reducing concentration of energy from laser beam 25 within the interior of tip 45, and extending the useful life of tip 45.

The method may also include connecting tip 45 to rod 50, which may be connected to plunger 55 when masking device 35 is assembled. After making this connection, plunger 55 and housing 60 may be used in conjunction with the jig to position rod 50 and tip 45 relative to workpiece 15, as previously discussed. It is contemplated that this positioning may prevent laser beam 25 from leaking around tip 45 and undesirably affecting secondary surface 40

Next, laser beam 25 may be emitted from laser emitter 20 toward primary surface 30. It is contemplated that laser beam 25 may machine a hole through primary surface 30 and impinge on tip 45. Tip 45 may reflect at least part of the energy of laser beam 25, preventing at least part of the energy of laser beam 25 from entering tip 45, and extending the useful life of tip 45. This reflected energy may be scattered such that it does not undesirably affect any surface of workpiece 15. Tip 45 may also absorb at least part of the energy of laser beam 25, preventing this energy from undesirably affecting secondary surface 40. Once absorbed, the energy may be transferred away from tip 45 via rod 50, preventing accumulation of energy from laser beam 25 within tip 45, and extending the useful life of tip 45.

It will be apparent to those skilled in the art that various modifications and variations can be made to the method and system of the present disclosure. Other embodiments of the method and system will be apparent to those skilled in the art from consideration of the specification and practice of the method and system disclosed herein. It is intended that the specification and examples be considered as exemplary only, with a true scope of the disclosure being indicated by the following claims and their equivalents.

What is claimed is:

1. A method of laser machining a primary surface of a rigid workpiece, the workpiece including the primary surface and a secondary surface, the method comprising:
   positioning a masking device such that a surface portion of a tip of an inserting member of the masking device is adjacent to an inner side of the primary surface of the rigid workpiece, the tip of the masking device being formed from at least one of corundum, cubic zirconia, spinel, diamond, or alumina ceramic, the masking device also including a pivotable joint located on an end of the inserting member,
   wherein positioning the masking device further includes mating the surface portion of the tip against the inner side of the primary surface of the rigid workpiece by pivoting and translating the inserting member;
   applying a laser beam to the primary surface of the workpiece to machine a hole through the primary surface; and
   protecting the secondary surface from energy of the laser beam by absorbing at least part of the energy of the laser beam with the tip of the masking device.

2. The method of claim 1, wherein providing the masking device includes providing a masking device having a tip formed from corundum.

3. The method of claim 2, wherein providing the masking device includes providing a masking device having a tip formed from blue sapphire.

4. The method of claim 1, further including determining a wavelength of the laser beam, wherein providing the masking device includes providing a masking device having a tip formed from a material selected based on the wavelength of the laser beam.

5. The method of claim 4, wherein providing the masking device includes providing a masking device having a tip formed from blue sapphire when the wavelength of the laser beam is between approximately 800 nanometers and approximately 2500 nanometers.

6. The method of claim 4, wherein providing the masking device includes providing a masking device having a tip formed from ruby when the wavelength of the laser beam is between approximately 490 nanometers and approximately 570 nanometers.

7. The method of claim 1, further including reflecting at least part of the energy of the laser beam with the masking device.

8. The method of claim 1, further including conducting energy in the form of thermal energy away from the tip via a rod.

9. The method of claim 1, wherein the inserting member is a shaft.

10. The method of claim 9, wherein the masking device includes a housing, wherein an end of the shaft is located in the housing.

11. The method of claim 10, wherein the end of the shaft is a first end, and wherein the tip is located on a second end of the shaft.

12. The method of claim 10, further including a spring and a plunger located within the housing such that the plunger pivotably mates with the end of the shaft at the pivotable joint, the pivoting of the inserting member occurring through the pivtotable joint and the translating of the inserting member occurring through the spring and the plunger.

13. A method of laser machining a primary surface of a workpiece, the workpiece including the primary surface and a secondary surface, the method comprising:
   positioning a masking device such that a surface portion of a tip of an inserting member of the masking device is adjacent to an inner side of the primary surface of the workpiece,
   wherein positioning the masking device further includes mating the surface portion of the tip against the inner side of the primary surface of the rigid workpiece by pivoting and translating the inserting member;
   applying a laser beam to the primary surface of the workpiece to machine a hole through the primary surface; and
   protecting the secondary surface from energy of the laser beam by absorbing at least part of the energy of the laser beam with the tip of the masking device.

14. The method of claim 13, wherein the tip of the masking device is formed from at least one of corundum, cubic zirconia, spinel, diamond, or alumina ceramic.

15. The method of claim 13, wherein the inserting element includes a shaft.

16. The method of claim 15, wherein the masking device includes a housing, wherein an end of the shaft is located in the housing.

17. The method of claim 16, wherein the end of the shaft is a first end, and wherein the tip is located on a second end of the shaft.

18. The method of claim 16, wherein the masking device further includes a pivotable joint located on an end of the inserting member.

19. The method of claim 18, further including a spring and a plunger located within the housing such that the plunger pivotably mates with the end of the shaft at the pivotable joint, the pivoting of the inserting member occurring through the pivtotable joint and the translating of the inserting member occurring through the spring and the plunger.

20. A method of laser machining a primary surface of a workpiece, the workpiece including the primary surface and a secondary surface, the method comprising:
- positioning a masking device such that a surface portion of a tip of a shaft of the masking device is adjacent to an inner side of the primary surface of the workpiece, the shaft at least partially being located within a housing,
    - wherein positioning the masking device further includes mating the surface portion of the tip against the inner side of the primary surface of the rigid workpiece by pivoting and translating the shaft with a pivotable joint located within the housing;
- applying a laser beam to the primary surface of the workpiece to machine a hole through the primary surface; and
- protecting the secondary surface from energy of the laser beam by absorbing at least part of the energy of the laser beam with the tip of the masking device.

\* \* \* \* \*